(12) United States Patent
Baxter, Jr.

(10) Patent No.: US 8,671,149 B1
(45) Date of Patent: *Mar. 11, 2014

(54) UNIFIED MESSAGING PLATFORM WITH INTELLIGENT VOICE RECOGNITION (IVR)

(71) Applicant: John Francis Baxter, Jr., Khueangnai Ubonratchatani (TH)

(72) Inventor: John Francis Baxter, Jr., Khueangnai Ubonratchatani (TH)

(73) Assignee: Weerawan Wongmanee, Khueangnai, Ubonratchatani (TH)

( * ) Notice: Subject to any disclaimer, the term of this patent is extended or adjusted under 35 U.S.C. 154(b) by 0 days.

This patent is subject to a terminal disclaimer.

(21) Appl. No.: 13/847,697

(22) Filed: Mar. 20, 2013

Related U.S. Application Data

(63) Continuation-in-part of application No. 13/649,418, filed on Oct. 11, 2012, now Pat. No. 8,428,228.

(60) Provisional application No. 61/702,521, filed on Sep. 18, 2012.

(51) Int. Cl.
*G06F 15/16* (2006.01)

(52) U.S. Cl.
USPC .......................................... 709/206; 709/246

(58) Field of Classification Search
USPC ................... 379/88.13, 88.14; 709/246, 206
See application file for complete search history.

(56) References Cited

U.S. PATENT DOCUMENTS

| | | | |
|---|---|---|---|
| 5,359,317 A * | 10/1994 | Gomez et al. | 340/7.52 |
| 6,311,210 B1 * | 10/2001 | Foladare et al. | 709/206 |
| 6,404,762 B1 | 6/2002 | Luzeski et al. | |
| 6,477,494 B2 | 11/2002 | Hyde-Thomson et al. | |
| 6,563,912 B1 | 5/2003 | Dorfman et al. | |
| 6,671,355 B1 * | 12/2003 | Spielman et al. | 379/88.12 |
| 6,683,940 B2 * | 1/2004 | Contractor | 379/88.17 |
| 6,792,082 B1 * | 9/2004 | Levine | 379/67.1 |
| 7,260,188 B2 * | 8/2007 | Gilbert | 379/88.21 |
| 8,483,652 B2 * | 7/2013 | Hall | 455/404.1 |
| 2004/0174963 A1 * | 9/2004 | Fellenstein et al. | 379/68 |
| 2005/0021339 A1 * | 1/2005 | Ruetschi | 704/269 |
| 2005/0193068 A1 * | 9/2005 | Brown et al. | 709/206 |

(Continued)

FOREIGN PATENT DOCUMENTS

| | | |
|---|---|---|
| KR | 20020036603 | 5/2002 |
| KR | 20110004798 | 1/2011 |

OTHER PUBLICATIONS

International Search Report for PCT/US2012/066599, International filing date Nov. 27, 2012, and a mailing date of Apr. 24, 2013.

*Primary Examiner* — Lance L Barry
(74) *Attorney, Agent, or Firm* — Andriy Lytvyn; Smith & Hopen, P.A.

(57) ABSTRACT

Unified communication system for consolidating different message sources (e.g. emails, SMS, voice message, fax, etc.) into a single accessible location with the ability to incorporate phone calls, VoIP calls, voice commands, etc. This is achieved through integration of a Speech-ready IVR system with an E-mail client to act as the Unified Communication System. Furthermore, the IVR flexibility allows the user to access messages when internet access is not available or read messages such as SMS and emails when not physically convenient e.g. when user is driving. A computer based server receives a message in the format of SMS, fax, e-mail, or phone message. The server identifies what format the message is in and displays a notification on a graphical user interface. Through integration with a speech ready IVR system user may select to listen to the message or read the message.

8 Claims, 8 Drawing Sheets

(56) References Cited

U.S. PATENT DOCUMENTS

| | | | |
|---|---|---|---|
| 2005/0193079 A1* | 9/2005 | Brown et al. | 709/207 |
| 2005/0193145 A1* | 9/2005 | Brown et al. | 709/238 |
| 2006/0020673 A1* | 1/2006 | Sorge et al. | 709/206 |
| 2006/0200532 A1 | 9/2006 | Skladman et al. | |
| 2007/0083918 A1 | 4/2007 | Pearce et al. | |
| 2007/0203735 A1* | 8/2007 | Ashton | 705/1 |
| 2007/0203736 A1* | 8/2007 | Ashton | 705/1 |
| 2007/0256021 A1* | 11/2007 | Prager et al. | 715/744 |
| 2007/0299924 A1* | 12/2007 | Tremblay | 709/206 |
| 2008/0192913 A1* | 8/2008 | Gopinath et al. | 379/207.04 |
| 2009/0196405 A1 | 8/2009 | Romeo | |
| 2010/0169424 A1 | 7/2010 | Gustafsson et al. | |
| 2011/0103302 A1* | 5/2011 | Hall | 370/328 |
| 2012/0123785 A1 | 5/2012 | Dhawan et al. | |
| 2012/0233274 A1* | 9/2012 | Salpietro et al. | 709/206 |

\* cited by examiner

UNIFIED MESSAGING PLATFORM WITH INTELLIGENT VOICE RECOGNITION (IVR)

CROSS REFERENCE TO RELATED APPLICATIONS

This application is a continuation-in-part of and claims priority to U.S. Pat. No. 8,428,228 issued on Apr. 23, 2013, which issued from U.S. application Ser. No. 13/649,418 entitled, "Unified Communication System", filed Oct. 11, 2012, which is a non-provisional of U.S. Provisional Patent Application No. 61/702,521, entitled, "Universal Communication System", filed Sep. 18, 2012, which is hereby incorporated by reference.

BACKGROUND OF THE INVENTION

1. Field of the Invention

This invention relates to unified communication systems. More specifically, it relates to enhanced unified communication systems with integration for SMS, instant messages, e-mail, phone, phone calls, voicemail, and fax.

2. Brief Description of the Related Art

Messaging systems and methods have come a long way since their early inception. Today users receive messages in a large variety of formats and on a large variety of devices; ranging from SMS messages to fax messages. Traditionally, users would have to receive different messaging formats and modes of communication separately. To help keep track of the wide variety of message input unified messaging systems have begun to develop. These services attempt to provide a unified messaging system for handling various types of messages. While some are more successful than others, there exists a need for a unified communication system that combines aspects of unified messaging systems and integrates them with additional features in a unique way to provide a single communication system.

An example of a Unified Messaging System is substantially disclosed in U.S. Pat. No. 6,404,762 B1 to Nicholas Luzeski et al., hereinafter the '762 patent. The '762 patent presents a Unified Messaging System for use in e-mail, fax, and voice messaging. The e-mail messages are stored on e-mail message store, while the fax and voicemail are stored on a Voice Mail Message Manager (VMMM). Subscribers access an Internet browser interface on their computer by logging in with a unique password and user name. Users are then presented with a "unified inbox" that displays all of the user's messages. While the '762 messaging system was a step in the right direction it has several disadvantages. First, the system fails to provide incorporation of SMS messaging. Second, the system relies on a graphical user interface for user interaction with the messaging system. A user cannot use voice prompts to access messaging services. This means that the usage is limited to when the user is able to look at the graphical interface and interact with the interface through non-verbal communication. Third, the system lacks customizable features to make the system a fully implemented unified communication system. For example, the system lacks the means to allow users to respond to messages through voicemail, SMS or integration with a phone system.

Another method of a unified messaging system is described in U.S. Pat. No. 6,563,912 B1 to Dorfman et al., hereinafter the '912 patent. The '912 patent provides a method of integrating voice mailboxes with various e-mail addresses, such that a stored voicemail may be sent to a user's email. When the voicemail is sent to a user's e-mail address it may be opened and subsequently listened to by the user. While this patent provides a method of receiving voice mail via e-mail it falls short of providing a fully integrated unified communication system that includes fax and SMS messaging. The system also fails to address outgoing communication (e.g. sending a voicemail or making a phone call) by a user to a third party.

U.S. Pat. No. 6,477,494 B2 to Hyde-Thompson et, hereinafter the '494 patent, discloses a Unified Messaging System that selectively provides voice messages and computer-generated speech messages to a set of subscribers. One of the unique features of this system is that it is configured to detect whether the message is received by text, voicemail, or e-mail. When a message is received, for example a text message, a trigraph analyzer examines text combinations found within the message to determine a language identifier. Based upon the identifier a message inquiry unit selects an appropriate text-to-speech engine and turns it into computer generated speech. This system provides advantages to users who may wish to listen to messages rather than read on a graphical user interface. It also provides the potential for a system to integrate text messaging with voice messaging. While this system provides many advantages, it fails to be a complete unified communication system. Specifically, the system fails to provide a system that integrates fax, SMS, instant messages, voicemail, e-mail and phone calls into one system. The system also fails to provide a way for users to send outgoing messages or to have the speech-converted email automatically delivered to the user's phone.

GMAIL® is a messaging system created by GOOGLE® that embodies a working example of some of the aspects disclosed in the in the above referenced patents. The messaging system utilizes an e-mail based messaging system that allows users to send real time messages through instant messaging. Additionally, the system permits users to make outgoing voice calls and video chat. This popular messaging system exemplifies several communication mediums in an attempt to create a unified communication system. While the system is successful in incorporating several messaging formats it fails to provide a system that does not rely solely on a graphical user interface. The system also lacks full integration with voicemail, fax, SMS messaging, voicemail and e-mail.

There exists a need for a unified communication system that can determine the message type received and display various message types in text, graphic and audio format. There also exists a need for a unified communication system that can provide outgoing messaging support for users in various messaging forms. Finally, there exists a need for a system that provides convenient logging of messages and display of logged messages. However, in view of the art considered as a whole at the time the present invention was made, it was not obvious to those of ordinary skill in the field of this invention how the shortcomings of the prior art could be overcome.

BRIEF SUMMARY OF THE INVENTION

The long-standing but heretofore unfulfilled need for a unified communication system is now met by a new, useful, and nonobvious invention.

The novel computer implemented method includes receiving a message and message destination to a database server. Database server compares the destination to a stored list of registered users to determine which registered user the message should be sent to. If the server finds a registered user matching the intended destination the message is associated with the registered user. Database server determines the format of the message and compares the format to a stored list of file formats. The database server identifies the message based upon a comparison resulting in a match. Message may be identified as SMS, email, voicemail, or fax. The message is tagged by the database server to indicate the format or type of message that was received.

A proxy server will then convert the message format based upon the registered user's preferences. For example, if a registered user prefers to receive all messages in audio format the database server will send the incoming message through a proxy server to convert text-to-speech. The converted message is then stored on the database server until it is sent to a user's inbox interface. In an alternative embodiment registered users may receive notification messages based upon the message's tag. Once a message is tagged the database server generates a pre-determined notification message responsive to the tag. Database server will then send the notification message to a registered user's preferred contact method.

The novel computer implemented method also includes a way for users to check messages through IVR computer based server integration. A registered user dials an access number for utilizing the IVR system. The IVR server receives a caller's phone number and compares it with a stored list of registered phone numbers, wherein each registered phone number is associated with a registered user. If the comparison results in a match the caller is logged into the matching registered user's account. If the comparison does not result in a match the user may be prompted to enter in a unique PIN and corresponding password to access a user's account.

Once a caller is logged into the system they will receive a series of audio prompts from the IVR server. Callers may interact with the IVR system through voice commands and DTMF commands. Audio prompts navigate the user through an inbox interface. The IVR server communicates with the database server to retrieve stored information and messages. In a preferred embodiment the stored messages are converted through a proxy text-to-speech engine.

The invention includes a novel system for use in a unified communication system. An IVR server is functionally integrated with a database server. The IVR server is operable to receive a caller's phone number and compare the number to a stored list of registered phone numbers, wherein each registered phone number is associated with a registered user's account. If the comparison results in a match the caller is logged into the matching registered user's account. If the comparison does not result in a match the user may be prompted to enter in a unique PIN and corresponding password to access a user's account.

IVR server functionally integrated with the database server sends a series of audio menu prompts from said IVR server to a caller, responsive to voice commands and DTMF commands received from the caller. Based upon caller selection the IVR server will retrieve a stored assortment of inbox interface information from the database server. In a preferred embodiment the information is converted through a text-to-speech engine in a proxy server. Database server may also be operable to receive a message and tag the message as SMS, email, voicemail or fax based upon the message format or source. A stored notification message is generated and sent to a registered user, responsive to the tagged message. The database server sends the message to a registered user's preferred contact choice.

BRIEF DESCRIPTION OF THE DRAWINGS

For a fuller understanding of the invention, reference should be made to the following detailed description, taken in connection with the accompanying drawings, in which.

DETAILED DESCRIPTION OF THE PREFERRED EMBODIMENT

In the following detailed description of the preferred embodiments, reference is made to the accompanying drawings, which form a part hereof, and within which are shown by way of illustration specific embodiments by which the invention may be practiced. It is to be understood that other embodiments may be utilized and structural changes may be made without departing from the scope of the invention.

Account Access

Method includes having a user access an email user interface containing the present invention. User will be prompted to log into the system by typing in a user name and password. If the user has not yet created an account they will be prompted to enter personal identification information and set up an account using a unique user name and password. The personal identification information can include the user's name, e-mail address and other information relevant to identification of the user. Personal information is then associated with the unique user name.

Email user interface displays e-mail content in an inbox. In a preferred embodiment the email interface will have new content extensions that add new message types viewable in the inbox window displayed on a graphical user interface. Users will have extensions that correspond to the new message types, such as voicemail, SMS, instant messages and fax. A user may access their account information through two separate methods. First, a user may access the information on a computer Internet browser or graphical user interface. Second, a user may access their account through a speech ready Interactive Voice Response (IVR) system. An IVR system is a technology that allows a computer to interact with a user through voice commands or dual-tone multi-frequency signaling (DTMF). This allows a user to interact with the e-mail interface without the need of a graphical user interface.

Message Type and Display

Figure 1:
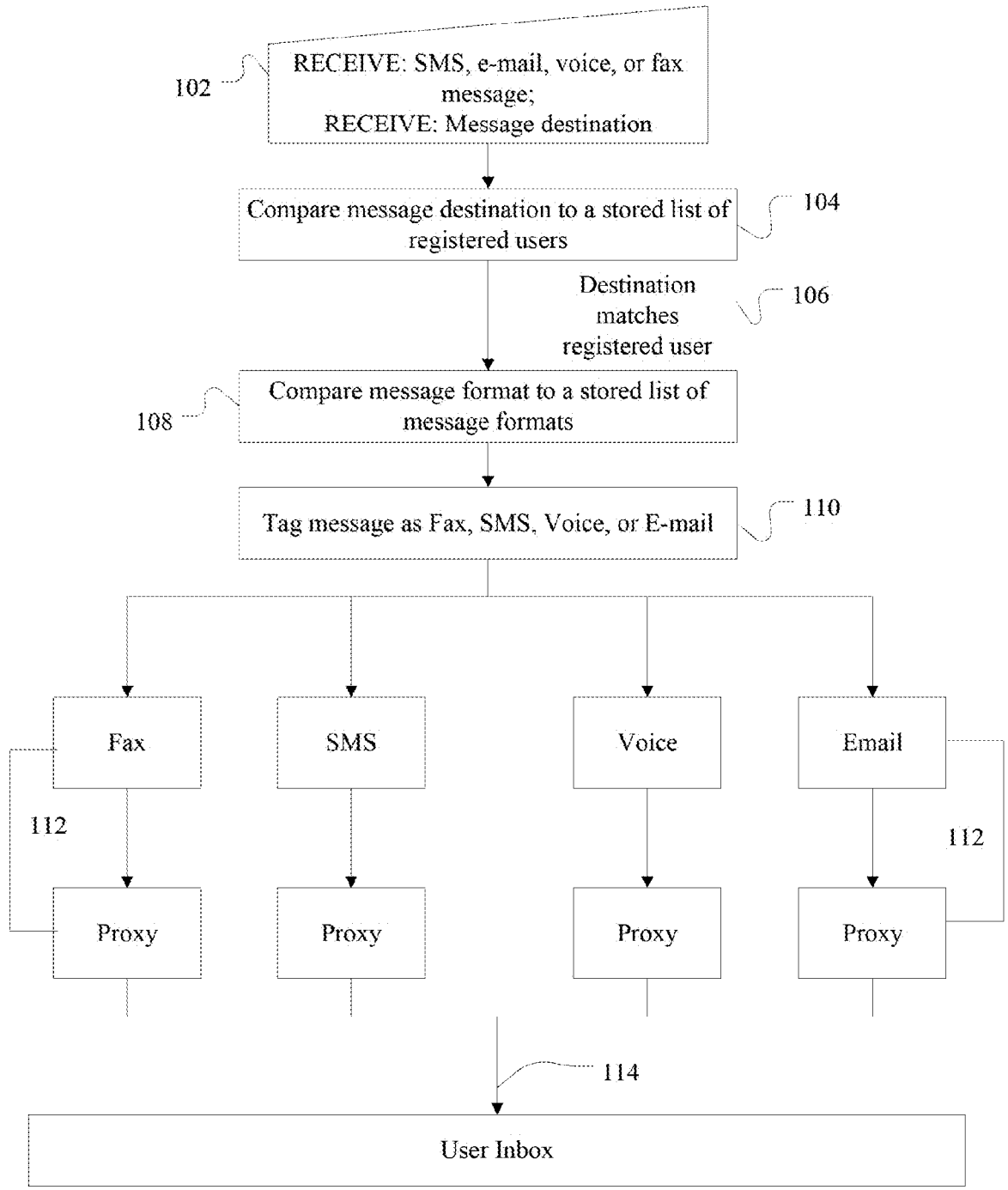
FIG. 1 is a flowchart of the method of categorizing incoming messages in accordance with an embodiment of the present in invention.

FIG. 1 depicts a flowchart of an embodiment of the present invention. The method includes receiving a message and a message destination from a particular source to a computer based server (operation 102). Message may be a SMS message, e-mail message, voice message, or fax. The destination may include any identifier used to identify a registered user, such as a registered user's email address or phone number. Destination identifier is compared to a stored list of identifiers to determine whether it belongs to a valid registered user (operation 104). If the comparison results in a match the message is identified as being sent to the registered user (operation 106). If the comparison does not result in a match the sender may receive a message indicating that the identifier does not belong to any registered users. The message format is compared to a list of various messaging formats, each format corresponding to SMS messages, email messages, voice messages or fax messages (operation 108). A comparison resulting in a match identifies the message as coming from one of the identified sources. Alternatively, the message may be identified based upon its source. An error may be indicated if the message does not come from an identifiable source. Once the message type is determined the server tags the message as coming from the identified message type (operation 110). A proxy converts the format of the message to preferred user settings. For example, if a user requests to receive all messages in Simple Mail Transfer Protocol (SMTP) format the proxy will convert the message to the desired format. Server receives the message in the preferred format and sends the message to user inbox (operation 114). In a preferred embodiment the message contains a graphical or textual identifier based upon the tag so that the user can easily determine the source of the message. For example, a picture of a telephone may be displayed to indicate a voice message.

If a user wishes to receive fax messages through another format the fax is sent from the server to a proxy. In a preferred embodiment the proxy utilizes optical character recognition (OCR) technology to translate the fax into text. After being converted into text the server may convert the message to preferred user format. For example, the text may be stored as an email or may be converted to audio through a TTS engine.

Voice messages can be converted through a proxy server that utilizes speech recognition dictation technology. Speech recognition dictation technology converts speech to text. There are several speech recognition software programs currently available and known in the art that can be used for the conversion. A proxy converts the text to the preferred format which is received to the user.

In an alternative embodiment the computer based server receives a message from a particular source. The message source is compared to a list of various messaging sources, each source corresponding to SMS messages, e-mail messages, voice messages or fax messages. A comparison resulting in a match identifies the message as coming from one of the identified sources. An error may be indicated if the message does not come from an identifiable source. Once the message type is determined the server tags the message as coming from the identified message type. The message is then sent to a user inbox in the message format it was received. The message contains a graphical or textual identifier based upon the tag so that the user can easily determine the source of the message. For example, a picture of a telephone may be displayed to indicate a voice message. Users may also choose which formats they wish to receive messages. For example, a user may select to receive SMS in SMTP format while receiving a fax in PDF, TIFF, plain text or in .WAV format. Alternately, the user may select to receive all messages in PDF format.

IVR Integration

A unique aspect of the present invention is that a user may access their account without need for a graphical user interface. This method is depicted in FIGS. 2-6. A main database server 202 is connected to an IVR unit via local or wide area network. This allows data to be transmitted between IVR unit 204 and main database server 202 for performance of automated customer service functions by IVR unit 204. Account records relating to each e-mail account are stored on main database server 202. Each account is assigned a unique PIN or identifier that allows a user to access their e-mail account.

The process of accessing an account through IVR 204 integration may be similar to what is traditionally seen in pre-paid calling cards. A user will pre-purchase minutes or a subscription to access their email account through IVR 204 integration. Users dial a number provided to them that accesses the database server 202. This may occur from a traditional landline telephone 210 through a PSTN network 206 or by a cellular phone 212 through a mobile network 208. Calling the number prompts the user to provide a unique PIN to access their e-mail account. In a preferred embodiment the unique PIN is the user's phone number. Upon receiving the unique PIN the server searches through a stored list of PIN numbers associated with user e-mail accounts. If the comparison results in a match the user gains access to the email account associated with the PIN through IVR 204 integration. If the comparison does not result in a match the user may receive an error that the PIN number was incorrect. Additional security measures may be incorporated to prevent users from gaining access to a different user's email account. This may include providing a unique number for each user to dial, wherein each number is associated with an email account. It may also include requiring users to input additional password and identification measures before they have access to their e-mail accounts; including requiring users to input their e-mail address through DTMF or keypad keys.

In an alternative embodiment users may access their accounts through PINless calling. A user may pre-register a phone number so that when a user dials the number to access their accounts they will immediately gain access to their e-mail account of using a registered phone number. In this embodiment a computer based server integrated with IVR receives a phone number from the user calling. The number is compared to a stored list of phone numbers, wherein each stored phone number is associated with a user's email account. If the comparison results in a match, the user gains access to their e-mail account. If the comparison does not result in a match, the user may receive an error.

Figure 3:
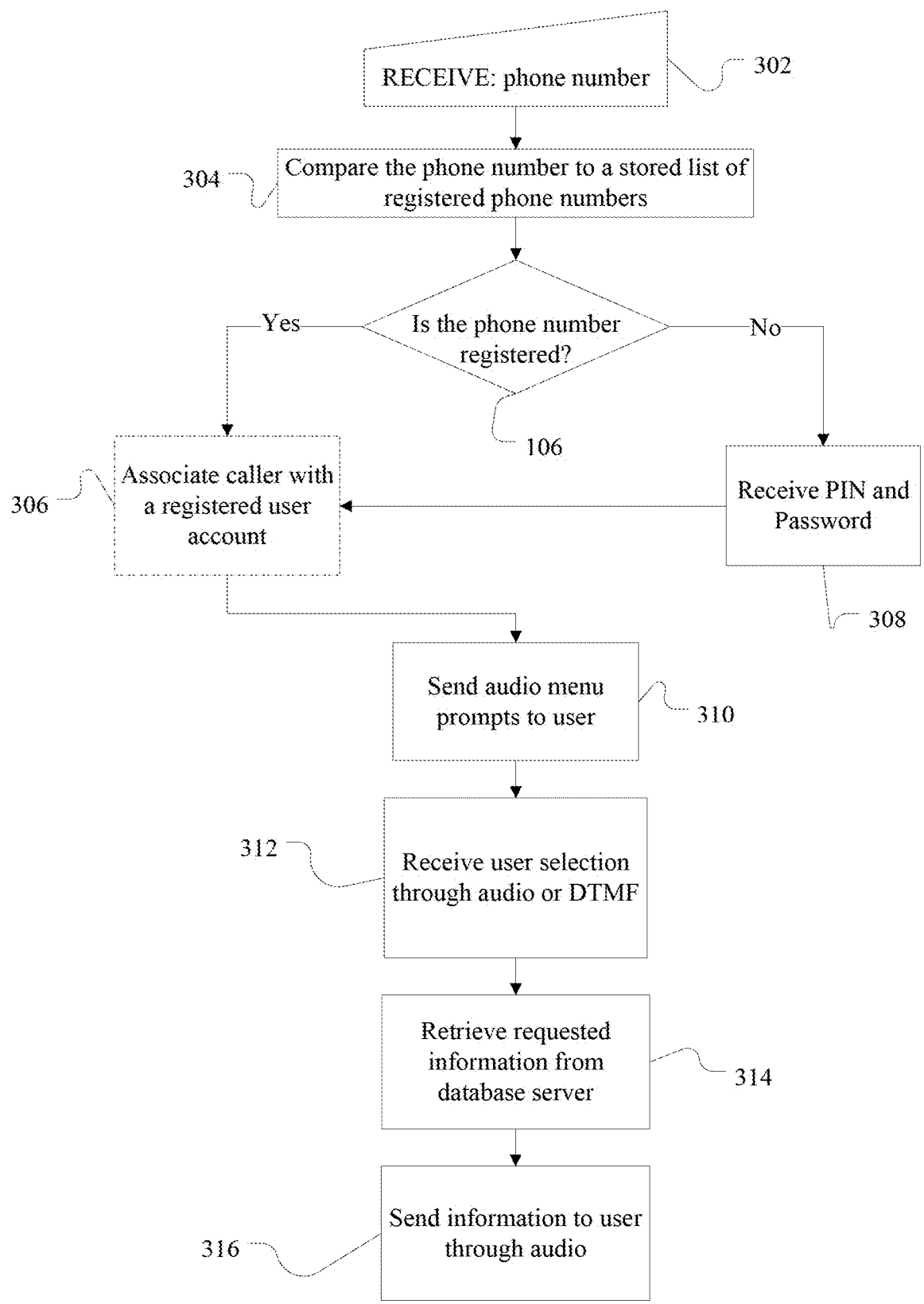
FIG. 3 is a flowchart of IVR server interaction with a database server in accordance with an embodiment of the present in invention.

FIG. 3 depicts a flowchart of an embodiment of this method. An IVR server (204) integrated with a database server (202) receives a phone number (operation 302). Server (202) compares the phone number with a stored list of phone numbers to determine whether or not the number is registered (operation 304). Each stored phone number is associated with a registered user's account. If the comparison results in a match the server associates the caller with the registered account (operation 306). If the comparison does not result in a match the server may generate an error message to send to the user. Alternatively, the user may be prompted to input a PIN and password (operation 308). PIN can be any combination of numbers, letters, or characters used to identify a registered user. Database server (202) will compare PIN and password to a stored list of PINs and corresponding passwords. Each PIN and corresponding password relates to a user's account. If the comparison results in a match the caller is associated with a registered user account (operation 306). If the comparison does not result in a match an error may be indicated.

Once a user is logged into their e-mail account, the user is prompted with a series of voice prompts through IVR 204 integration (operation 310). Voice prompts relate to a menu of options relating to services offered through an email client utilizing the present invention. Users may navigate the menu through use of voice commands or DTMF. In a preferred embodiment the menu is split into categories based upon user selected options. For example, the system may be separated into a main menu and subsequent menus based upon user selections in the main menu. Subsequent menus may include menus such as: listen to messages, leave voicemail, send message, send SMS, make a call, send e-mail, or a variety of other features available in a unified messaging system. Database server 202 receives user input through IVR 204 integration to determine user selection to specific prompts (operation 312). Based upon user IVR 204 input database server 202 retrieves the requested information and messages (operation 314). Information is then sent to user depending on user's preferred method (operation 316). For example, the information and messages may be converted from text to speech (TTS). In an alternative embodiment the retrieved messages may be displayed on a graphical user interface.

Figure 2:
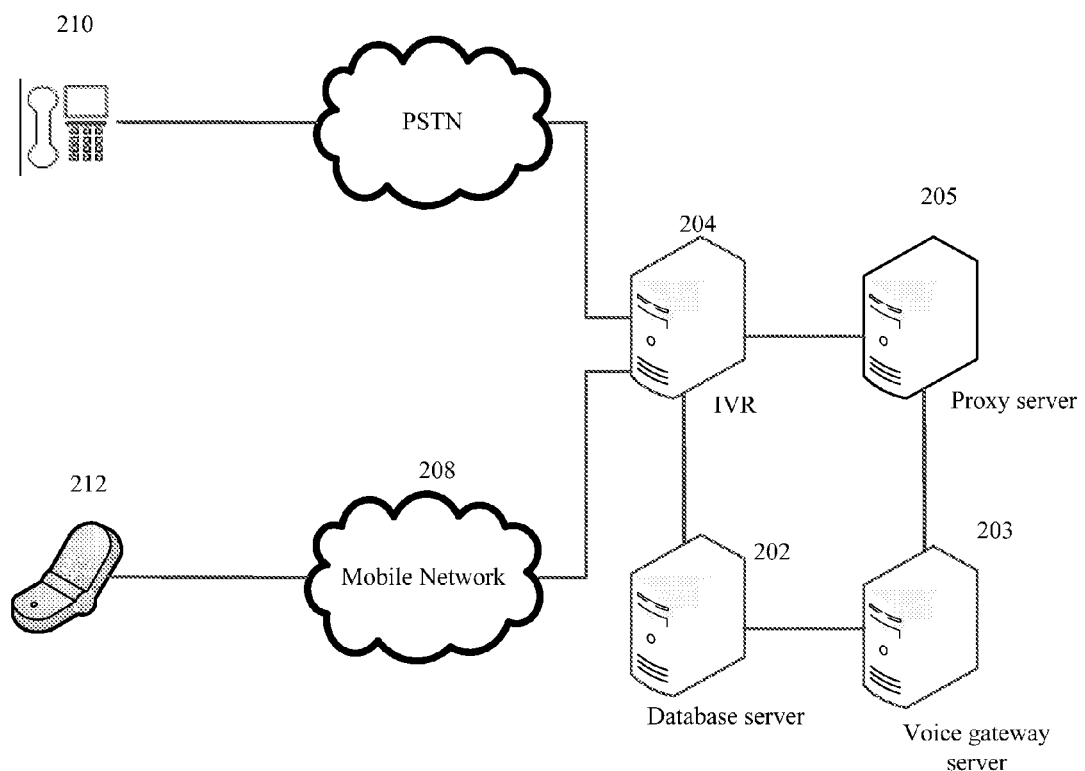
FIG. 2 is an exemplary block diagram of the functional interaction of the components used to provide an email client with IVR integration in accordance with an embodiment of the present in invention.

Referring to FIG. 2, if the user selects to receive the information in TTS format, the database server 202 sends the requested text to a voice gateway server 203. The TTS conversion method used is similar to those currently known in the art. Voice gateway server 203 facilitates the exchange of messages between computer based messages and telephone messages. Voice gateway server 203 contains a series of text-to-speech engines that are used to convert the text to speech. The language selection may be pre-selected by the user. If the language selection is pre-determined, voice gateway server 203 selects the selected text-to-speech engine and initiates the conversion of the message into computer generated speech. Computer generated speech is then played to the user in a conventional manner known in the art. In an alternative embodiment the speech selection may be determined through a trigraph analyzer, such as the one substantially disclosed in U.S. Pat. No. 6,477,494, to Hyde-Thompson et. al., herein incorporated by reference. Message formats may be converted through proxy server 205 to ensure that the text-to-speech engine can identify and read the message.

Figure 4:
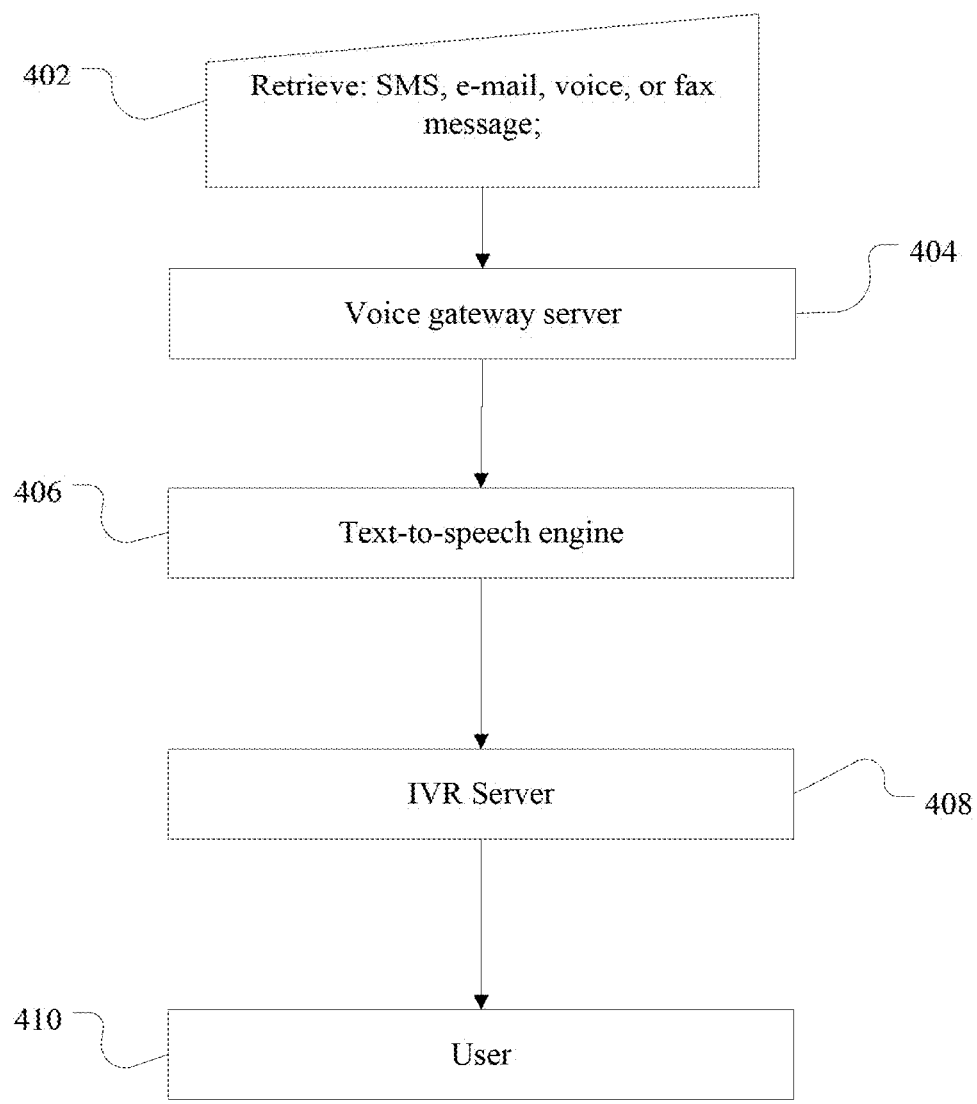
FIG. 4 is a flowchart of text-to-speech conversion of messages in accordance with an embodiment of the present in invention.

FIG. 4 depicts a flowchart of an embodiment of the method. Referring to FIGS. 2 and 4, database server 202 retrieves the message, which may be SMS, email, voice or fax (operation 402). Message may be converted through proxy server 205 to a format accepted by the TTS engine. Voice gateway server 203 receives the message (operation 404). Text to speech engines within voice gateway server or 203 converts the text to speech (operation 406). Converted text is sent to IVR server 204 (operation 408). User will receive the converted text in audio format on their telephone or mobile device (operation 410).

Figure 5:
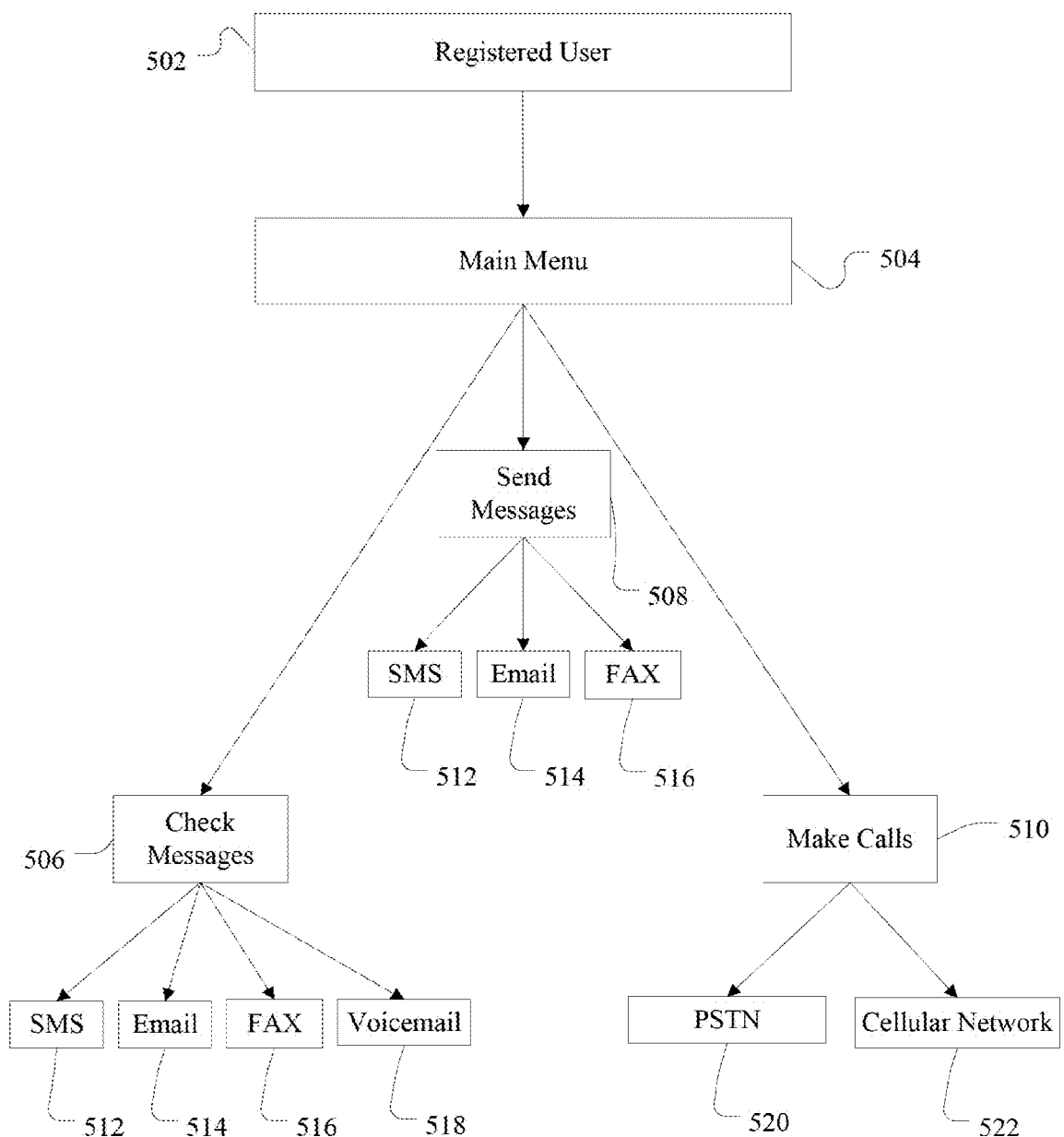
FIG. 5 is a flowchart of IVR system prompts in accordance with a preferred embodiment of the present invention.

When navigating the IVR system each user prompt is given an ID, a code and is stored as an audio format, preferably Waveform Audio File Format (WAVE/WAV). FIG. 5 depicts an embodiment of the call flow prompt. A registered user 502 receives a series of prompts on a main menu 204. Prompts may include a series of options that the user may select through voice commands or DTMF. For example, the main menu 204 may indicate "press 1 to check messages 506; press 2 to send messages 508; press 3 to make a call 510." Once the user selects a subsequent menu they are prompted with another series of options which may include selecting whether a user wishes to view SMS 512, email 514, fax 516 or voicemail 518 messages. Additionally, user may select to make calls through PSTN 520 or cellular network 522. Database server 202 retrieves the requested information responsive to the user input through IVR 204 integration. In a preferred embodiment the system will require DTMF commands if the system does not recognize voice commands after a pre-determined number of unsuccessful attempts.

Message Body Selection

A novel aspect of the present invention is the ability for the system to automatically select portions of a message based upon pre-determined user preferences. This feature allows a user to indicate specific portions of a message that are particularly relevant to the user. Only the pre-determined information will be stored and sent to the user.

Figure 8:
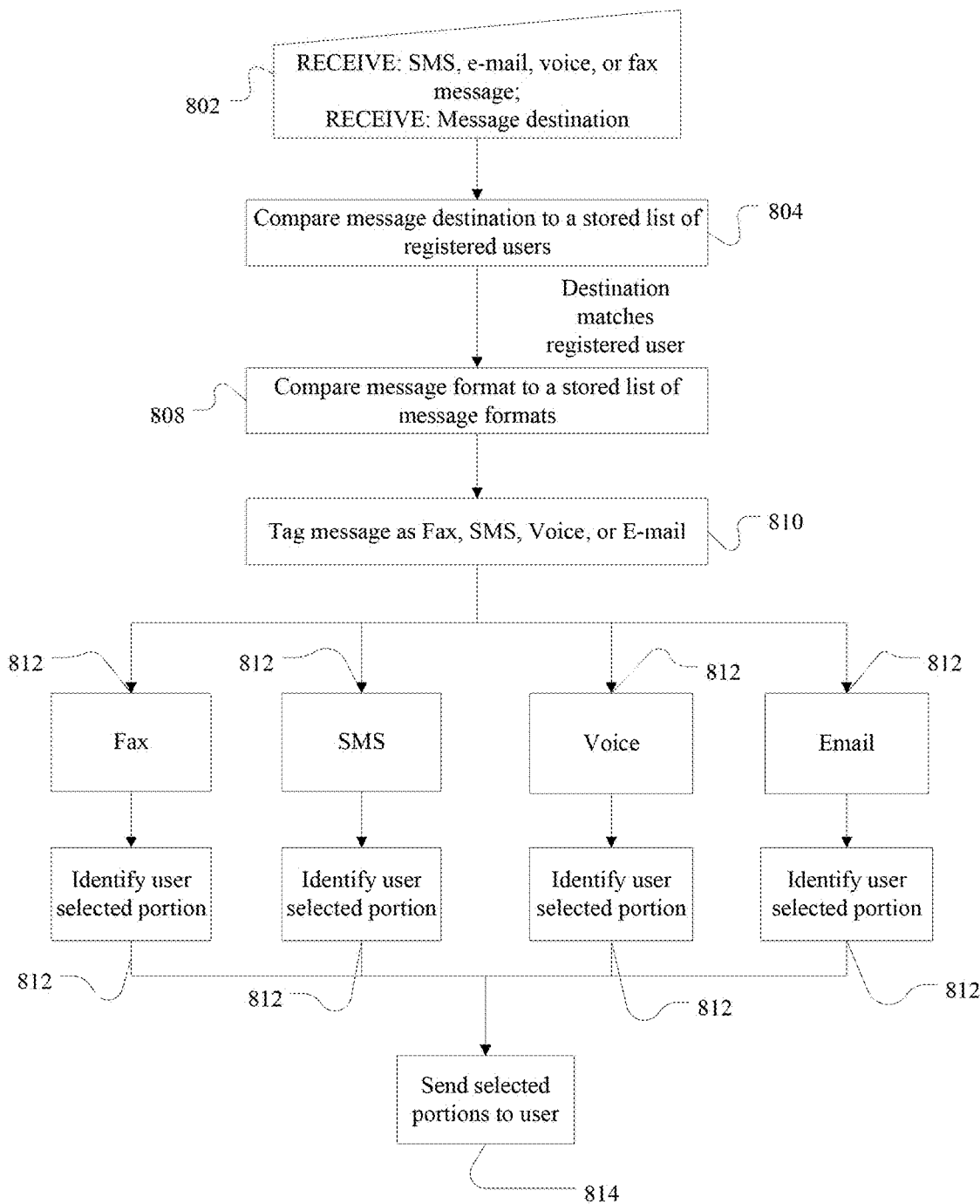
FIG. 8 is a flowchart of the method of tagging and selected user preferred message portions in accordance with a preferred embodiment of the present invention.

FIG. 8 depicts a flow chart illustrating the method of automatically receiving, determining and sending only user selected portions of a recipient targeted communication. The method includes receiving a message and a message destination from a particular source to a computer based server (operation 802). Message may be a SMS message, e-mail message, voice message, or fax. The destination may include any identifier used to identify a registered user, such as a registered user's email address or phone number. Destination identifier is compared to a stored list of identifiers to determine whether it belongs to a valid registered user (operation 804). If the comparison results in a match the message is identified as being sent to the registered user (operation 806). If the comparison does not result in a match the sender may receive a message indicating that the identifier does not belong to any registered users. The message format is compared to a list of various messaging formats, each format corresponding to SMS messages, email messages, voice messages or fax messages (operation 808). A comparison resulting in a match identifies the message as coming from one of the identified sources. Alternatively, the message may be identified based upon its source. An error may be indicated if the message does not come from an identifiable source. Once the message type is determined the server tags the message as coming from the identified message type (operation 810).

Tagged messages 112 are compared with pre-determined user logical preferences. The user logical preferences are an indication of selected portion(s) of the message that the user would like to view. For example, the user may indicate that he would like to only receive date, time, and the body of the message. The server will identify the user selected portions (operation 812) and send only the user selected portion (operation 814) to a user inbox. User selected portions may be any portion of a received message including, but not limited to, attachments, embedded links, text, body of message, to and from information, date and time stamp and other identifiable information. A user may specify certain limitations for message content based upon tagged message information. For example, a user may indicate that they wish to receive all portions of an SMS message in their inbox, but wish to limit voicemail messages to the audio portion of the message. As a result, voice messages would be sent to user and stored as an audio file in user's inbox without the additional information.

In a preferred embodiment, this feature is integrated with the conversion capabilities of the present invention. For example, a user may indicate that they wish to receive all voicemail messages in text format. The proxy server will convert the voicemail to Simple Mail Transfer Protocol (SMTP) format based upon user selected preference. The server will then identify user preferred portions of voice mail. Only user selected portions of converted voicemail will be sent to a user's inbox.

This novel feature may additionally be integrated with an IVR server for expanded options when receiving messages through a phone. Based upon tagged message server will determine relevant portions prior to sending message through the TTS engine. Only the user selected portions of the message are sent to a user's phone in audio format. In an alternative embodiment, IVR server may contain menu options for listening to the full message or only preselected user portions.

The system also include the ability for a user to define what portions of a message they wish to receive based upon preferred contact method. For example, a user may indicate that they wish to receive only the body of a message when the preferred contact method is through IVR integration or voicemail and to receive the entirety of the message when the preferred contact is through an email interface on a computer. A user may switch between preferred contact methods based upon user preference. For example, a user may indicate that they wish to receive messages to their cell phone for a specific period of time. During that defined time, the user will only receive messages in the user selected form, voicemail or IVR integration. Any messages received during the pre-determined time period will be only received according to pre-determined user selected portions for receiving messages on user's cell phone. When a user selects to no longer receive messages through their cell phone, the entirety of the message will again be received by the user based upon user selected preference. As a result, users may indicate portions of a message they wish to receive based upon preferred contact method at the time the message is received.

Users may also customize IVR menu based upon portions of messages they wish to listen to. In this embodiment, the IVR server menu prompt will include a menu option for selecting portions of a received message. For example, menu options may include: "body of message", "message type", or any other portion of a selected message. Users may also customize menu options and specific portions of the message to be included within the menu options. For example, user may indicate they wish to have a menu option that only provides a date and time stamp with the body of the message. Upon selecting this option from the IVR menu, the IVR server will only convert and read selected portions to the user.
Notifications Integration of an IVR system allows users to receive notifications through text, email, and phone calls. Users may select on which devices and through which methods they wish to receive notifications. When the database server receives a message it compares the destination with a stored list of users. If the comparison results in a match the system will associate the message with the registered user. A notification will then be sent to a user based upon user selected preferences. Server will generate a predetermined message based upon message type. For example, the message may state "you have a new email" when a user receives a message in SMTP format.

A user may receive a computer generated e-mail message notifying the user that a message was received. In this embodiment, the computer based server identifies the message it has received based upon format or source. Server retrieves a server message based upon the message identification. The server message contains details about the message. For example, if a voicemail is received the message may state "a voicemail was received at 6:00 P.M." This message is sent to the user's inbox.

Alternately, a user may decide to receive the notification messages on a mobile device through SMS messages. In this example, server builds a notification message indicating a message has been received. Server builds the notification message that the user of registered device will read upon receiving the text message. Server then calls an API method defined under Nitrogen Web Services Framework to send the text message. The Nitrogen API method is written in PHP and builds HTTP request that is sent to a server hosting SMS gateway service. HTTP request includes the text to be displayed, the phone number to send the text message to, and an Internet Protocol (IP) Address of the server where SMS gateway service runs. SMS gateway service is provided by an open source Kannel software package. SMS gateway service is the link between SMS mobile providers and the Content Provider. SMS gateway service handles connections with SMS mobile providers and relays them onward in a unified form. Once SMS gateway service receives HTTP request from the Nitrogen API method, it parses the request and sends the information to GSM Network for SMS text message delivery through mobile network to registered device. It is noted that there other known methods and processes that can be used to send and receive SMS messages to and from mobile devices that may be utilized.

Through IVR integration users are able to receive message notifications through voice calls. A server generated notification message is sent to the voice gateway server to facilitate the exchange of messages between computer based messages and telephone messages. The voice gateway server contains a series of text-to-speech engines that are used to convert the text to speech. In a preferred embodiment, the message format is formatted through a proxy for easy TTS conversion. Once the message is converted to speech a call is placed using a user's entered contact number. Call is sent through a public switched telephone network (PSTN). From the PSTN, the message may be sent to a wired phone or to a mobile switching center where it contacts a base station and is sent to a mobile device. When a user answers the phone call the automated message is played for the user. In an alternative embodiment, the automated message may include user prompts that allow a user to access their messages. For example, after indicating a new message is received, the user may be prompted to input a voice command or DTMF command to access their inbox. Navigation of the inbox occurs through voice commands and DTMF commands.

Figure 6:
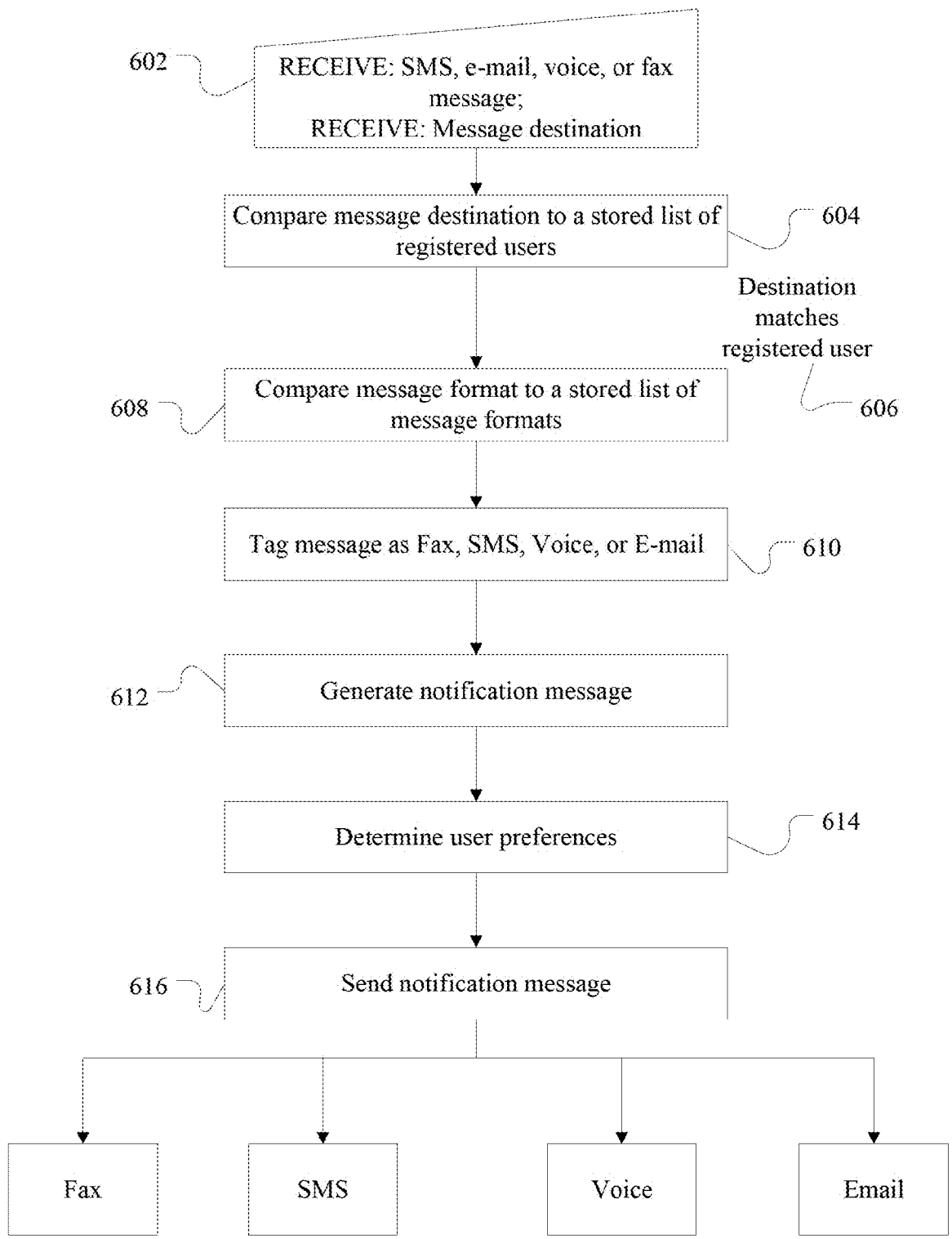
FIG. 6 is a flowchart of the method of generating and sending a notification message in accordance with a preferred embodiment of the present invention.

FIG. 6 depicts an embodiment of the present invention. A computer based server receives an SMS, e-mail, voice, or fax message and a message destination (operation 602). The destination may include any identifier used to identify a registered user, such as a registered user's email address or phone number. Destination identifier is compared to a stored list of identifiers to determine whether it belongs to a valid registered user (operation 604). If the comparison results in a match the message is identified as being sent to the registered user (operation 606). If the comparison does not result in a match the sender may receive a message indicating that the identifier does not belong to any registered users. The message format is compared to a list of various messaging formats, each format corresponding to SMS messages, e-mail messages, voice messages or fax messages (operation 608). A comparison resulting in a match identifies the message as coming from one of the identified sources. Alternatively, the message may be identified based upon its source. An error may be indicated if the message does not come from an identifiable source. Once the message type is determined the server tags the message as coming from the identified message type (operation 610).

Server then generates a predetermined notification message based upon the format type of the message. For example, a notification message indicating an email was received if the message is in SMTP format (operation 612). Notification message may contain date, time, and other information relating to the message. Server will then retrieve user preferences for how they wish to receive the notification message (operation 614). Server will then send the notification message to a user's fax, SMS, voice or email depending on user preferences (operation 616).

Call Out Feature

A preferred embodiment of the invention integrates a "call out" feature with the unified communication system. The "call out" feature allows users to call a third party's telephone. This is done through Voice over IP (VoIP) integration with the messaging system. An example of a VoIP system is illustrated in the email interface known as GMAIL®. VoIP allows calls to occur by sending encoded speech over an IP network as digital audio via an audio stream. The present invention adds an addition to this system. Each list of numbers contained within a received message is linked to the "call out" feature. This allows a user to select the numbers contained within a message and have the numbers be automatically input into the "call out" feature. Additionally, a server may compare the number with a stored list of phone numbers, wherein each phone number relates to a saved contact. If the comparison results in a match, the server will identify the number as belonging to the individual.

Call Log and Listen

In a preferred embodiment calls are logged and may be played through an audio feature. Once a call is initiated through the application the call is logged, given a date stamp and call duration. The user has the option of whether or not to record the conversation as an MP3 file, WAV file or other known audio formats. Alternatively, the calls may be automatically saved and stored upon completion. The call log stores a list of the calls indicating start time, date, duration, caller, dialed number of outgoing and other pertinent information. A user may select a stored call to listen to the recorded conversation. Once selected a new window appears on the graphical user interface that allows the user to control the volume, start, stop, fast forward and rewind of the phone conversation. Additionally, users will be able to loop play, which allows play of the current record file repeatedly until change of function, and sequential play, which will play records from the current entry one by one until the end or change of input is received from user. Users may also play selected portions of the audio file.

In an alternative embodiment the call log is displayed in audio wave form. This allows users to highlight specific portions of the wave and edit the audio file. This is done by moving the mouse to the beginning location where user wishes to listen to, and dragging the mouse to the ending location where the user wishes to listen to. The user may select specific beginning and ending starting points and extract a portion of the conversation to let third parties listen. Third parties will get either the entire audio file or a link to the audio file stored on the server.

SMS Listing

In a preferred embodiment SMS messages are listed in the inbox interface as a separate category from other messaging formats. SMS listing is a feature that allows text messages to be listed within an email inbox. Users may select to list both incoming SMS messages and sent SMS messages. The SMS listing may include a date stamp, phone number/name of person from whom the message was received, phone number/name of person to whom the message was sent, and the content of the message.

Voice Messages

Voice messages are stored in a list similar to the SMS listing and call logs. Voice message logs can contain both incoming and outgoing voice messages. Each message is given a date stamp and phone number from whom the message was sent. If the user selects a play back, an audio player opens on the graphical user interface similar to the one described in the "call log" feature. Users may perform all of the same functions available in the "call log" feature, such as looping, highlighting sections, and rewind. Voice messages may be converted to text so that they are searchable by the user. Integration of the IVR system allows users to receive messages in varying formats, includes audio. In a preferred embodiment messages received through and converted to audio format may be stored under voice messages.

Click to Dial (CTD)

Click to Dial (CTD) feature adds additional content to the user interface. The click to dial feature allows a user to call an individual from a phone number provided in an e-mail, SMS, instant message, fax, etc. or the sender's phone number as stored in the user's address book. When a user hovers over a phone number embedded within a message a display appears indicating that the user has the option to dial the number. When a user hovers over the sender's name embedded within a message a display also appears indicating that the user has the option to dial the various numbers that are associated with the sender e.g. his mobile, work or home number.

This feature can also be used straight from a user's address book. Alternatively, a user may select the CTD feature from the menu bar to access the CTD feature. No matter how the CTD feature is selected, a graphical representation of a phone is displayed on the user interface. Users may interact with the graphical phone as they would a physical embodiment of the phone. For example, users may click on the keypad of the graphical phone to dial or input numbers. Users may dial and hang up by clicking the appropriate keys on the graphical phone. When a user selects the CTD feature from an e-mail or a stored contact the number is automatically input into the graphical phone. Alternatively, a user may dial the number by inputting the number they wish to dial through the graphical keypad. This method involves use of VoIP methods known in the art.

Fax

This feature may provide a list of information, such as number/person the fax is from, number/person the fax is sent to, subject, time and date received, number of pages and a click-to-view button. When a user clicks on a specific fax entry a fax view screen is displayed. The fax viewer may allow editing, stamping, saving and other features to view and manipulate the fax document.

If a user wishes to receive fax messages through another format the fax is sent from the server to a proxy. In a preferred embodiment the proxy utilizes optical character recognition (OCR) technology to translate the fax into text. After being converted into text the server message may be stored based upon user preferences. For example, the text may be stored as an email or may be converted through a TTS engine.

Preferred Embodiment

Figure 7:
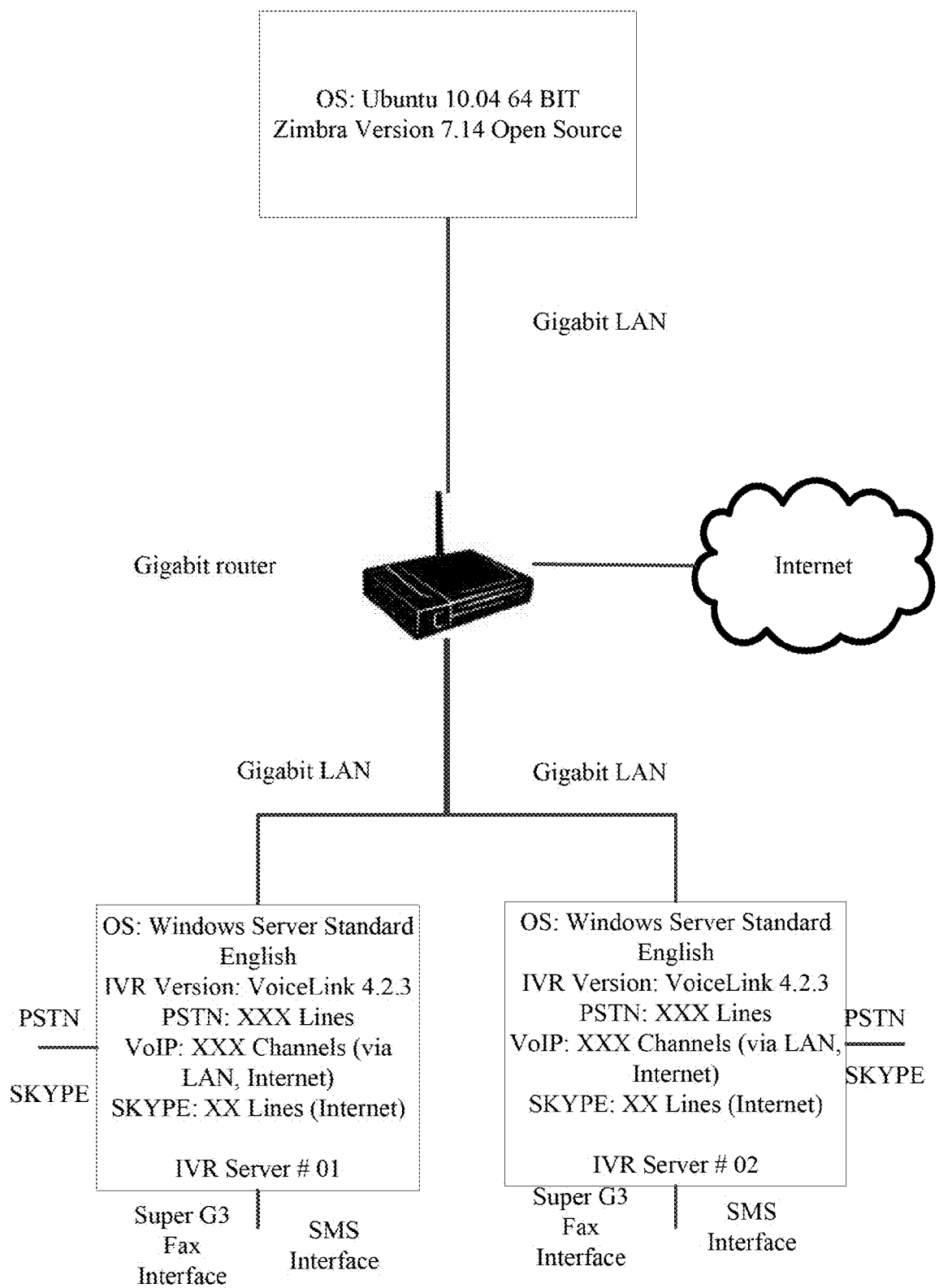
FIG. 7 is an exemplary block diagram of the functional interaction of the components used to provide an email client with IVR integration in accordance with an embodiment of the present in invention.

In a preferred embodiment of the invention, the unified communication system will function as an enhancement of email client software ZIMBRA®. FIG. 7 is diagram of how this embodiment may work. ZIMBRA® version 7.14 Open Source software is integrated with the embodiments of the present invention. A Gigabit router connects the email client to the internet and two IVR servers. Each IVR server has a windows server standard English operating system. The preferred IVR is VoiceLink 4.2.3, which connects to a number of PSTN lines, VoIP channels and Skype lines. In a preferred embodiment the IVR servers connect to a Super G3 Fax interface and a SMS interface.

The computer readable medium described in the claims below may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wire-line, optical fiber cable, radio frequency, etc., or any suitable combination of the foregoing. Computer program code for carrying out operations for aspects of the present invention may be written in any combination of one or more programming languages, including an object oriented programming language such as Java, C#, C++ or the like and conventional procedural programming languages, such as the "C" programming language or similar programming languages.

Aspects of the present invention are described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The advantages set forth above, and those made apparent from the foregoing description, are efficiently attained. Since certain changes may be made in the above construction without departing from the scope of the invention, it is intended that all matters contained in the foregoing description or shown in the accompanying drawings shall be interpreted as illustrative and not in a limiting sense.

Glossary of Claim Terms

Audio speech: an electronic representation of sound or speech.

Caller: a person or device that originates a call through a telecommunication network or mobile network.

Computer based server: a computer hardware system dedicated to running one or more services. Services can vary from database server, file server, mail server, print server, web server, or various other types services achieved through a computer program.

Contact method: a means of contacting a specific person or entity.

Database: refers to a collection of data and information that is typically stored in an organized fashion. Data and information can be retrieved.

DTMF: stands for dual tone multi-frequency signaling. Telecommunications signaling over a telecommunication network using a telephone's touch keys.

Email: is a method and system for transferring and receiving electronic messages. Generally, email systems operate through the internet or computer-computer networks.

Fax: also known as facsimile, is a telephonic transmission of scanned or printed material.

Material may be sent through fax machines, fax servers, or other computer systems capable of receiving and storing incoming faxes.

Graphical user interface: a type of user interface that allows users to interact with electronic devices.

Inbox interface: an interface is a point of communication between a computer and another computer of server. It is a point of interaction between components through software or hardware. An inbox interface is a point of contact between a computing device and a server or another computing device containing information relating to messaging.

IVR: stands for Interactive Voice Response. Technology and systems that allow a human to interact with a computer throw DTMF tones and voice commands.

Message: generally means an object of communication or vessel which provides information. This can include, but is not limited to, SMS, e-mail, or voicemail.

Message format: refers to the way that message information is encoded for sending, storage, and retrieval. Can also be referred to as file format. Some file formats are used for particular sets of data.

Menu prompts: a series of commands or options used to assist or ascertain a response.

Mobile Network: also referred to as a cellular network. It is a radio network used to distribute calls over a geographic area through a transceiver.

Notification: a means of giving notice to an individual or entity about an event.

Open source software: computer software available in source code form that can be allows users to study, change, improve and sometimes distribute software.

Password: a word or string of characters used for authentication. Generally, used to establish an identity or gain access to information or resources.

Phone number: string of numbers that associates a particular set of numbers with a particular phone or cell phone. The string of numbers can be used by someone to dial or reach another telephone, cell phone or other electronic device associated with the specific string of numbers dialed.

PIN: stands for personal identification number. Generally, a pin is a series of numbers and letters that are used to identify or associated with a specific entity or subject.

Proxy server: a server that acts as an intermediary for requests from clients seeking resources from other servers.

PSTN: stands for Public Switch Telephone Network. Known as the network of public circuit-switch telephone networks throughout the world.

Receive: to take delivery of something.

Registered phone number: a phone number in a stored list or record.

Registered users: A user that has elected to associate with a particular website, interface, or business. Generally, a registered user provides credentials or information to establish or show his/her identity.

Send: to cause of instruct something to go to a destination.

SMS: stands for Short Message Service. It is the text communication component of phone, web, or mobile communications systems that allows users to send and receive short messages between fixed line or mobile devices. Currently, SMS text messaging is the most widely used data application in the world for mobile phone subscribers.

Stored list: list of characters, information, or data stored on a computer based server.

Tagging: is a keyword, term, or series of characters used to identify a piece of information for later identification or categorization.

Text-to-speech engine: text to speech system converts text into speech. Generally, a text-to-speech engine comprising two parts. A front end converts raw text into readable words which are assigned phonetic transcriptions. A synthesizer then converts the words into speech.

User account: an account that is identified with a specific end-user.

Voice commands: a series of responses issued that are read by a computing device or computer based server to perform a specific function.

Voicemail: stored telecommunication voice messages.

What is claimed is:

1. A unified messaging platform having computer-implemented content conversion based on recipient designation, the platform comprising:
   a user store database communicatively coupled to a proxy server, the user store database containing an array of logical preferences set by a user of the messaging platform, the logical preferences defining a singular message format for delivery of a recipient-targeted communication, wherein the logical preferences include an indication of preferred user selected portions of the recipient-targeted communication;
   the proxy server operable to:
      receive the recipient-targeted communication selected from the group consisting of an email, a text message, a fax, and a voice message;
      identify the recipient-targeted communication for a recipient;
      tag the identified recipient-targeted communication;
      receive the user's logical preferences;
      determine a preferred user selected portion in the recipient-targeted communication based upon the user's logical preferences, the preferred user selected portion being selected based on a type of information contained therein; and
      send only the preferred user selected portion in the recipient-targeted communication to the user;
   a voice gateway server containing a text-to-speech engine for automatically converting the recipient-targeted communication to an audio message format as defined by the user's logical preferences, wherein the converted message is delivered in the audio message format to the user; and
   an IVR server functionally integrated with a database server and the voice gateway server operable to:
      send an audio rendering of the preferred user selected portion of the recipient-targeted communication to the user's phone,
      receive a caller's phone number,
      compare the caller's phone number to a stored list of registered phone numbers, wherein each the registered phone number is associated with a registered user,
      associate the caller with a registered user account, responsive to the comparison resulting in a match,
      request additional information, responsive to the comparison not resulting in a match, wherein the additional information includes a PIN and a corresponding password, each the PIN and the corresponding password associated to a registered user, and
      associate the caller with the user store database, responsive to the PIN and the corresponding password correctly identifying the registered user.

2. The unified messaging platform of claim 1, further comprising a voice gateway server for converting the recipient targeted communication to a message format as defined by the user's logical preferences.

3. The delivering of the converted recipient-targeted communication of claim 1, wherein the converted recipient-targeted communication is sent to a registered user's phone in SMS format.

4. The unified messaging platform of claim 1, further comprising:
   the proxy server further operable to:
      identify the recipient-targeted communication as from the group consisting of an email, a text message, fax, and a voice message;
      tag the recipient-targeted communication as from the group consisting of an email, a text message, fax, and a voice message;
      generate a pre-determined notification message based upon the recipient-targeted communication's message type;
      determine the user's preferred communication contact selected from the group consisting of an email, a text message, a fax, and a voice message;
      send the pre-determined notification message to the user's preferred communication contact.

5. The unified messaging platform of claim 1, wherein the IVR server presents a plurality of audio menu prompts pre-determined by user logical preferences.

6. The unified messaging platform of claim 1, further comprising:

the conversion server operable to convert the recipient-targeted communication to an SMS, a fax and an e-mail format.

7. The unified messaging platform of claim 1, further comprising:
the proxy server further operable to:
identify the recipient-targeted communication as from the group consisting of an email, a text message, fax, and a voice message,
tag the recipient-targeted communication as from the group consisting of an email, a text message, fax, and a voice message;
determine the user's preferred communication contact selected from the group consisting of an email, a text message, a fax, and a voice message;
compare the tagged recipient-targeted communication with the user's preferred communication contact;
determine whether tagged recipient-targeted communication matches the user's preferred communication contact;
send the tagged recipient-targeted communication to the conversion server, based upon a determination the tagged recipient-targeted communication does not match the user's preferred communication contact;
the conversion server further operable to:
receive the tagged recipient-targeted communication;
identify the user's preferred communication contact;
convert the tagged recipient-targeted communication to the user's preferred communication contact;
send a converted recipient-targeted communication to user.

8. The unified messaging platform of claim 1, wherein, the user selected portion is selected from the group consisting of an attachment, an embedded link, a text, a body of the recipient-targeted communication, sender information, recipient information, a sent date, a sent time, a receipt date, a receipt time, and a combination thereof.

* * * * *